United States Patent [19]

Finsterwalder

[11] 4,294,702

[45] Oct. 13, 1981

[54] APPARATUS FOR THE CONTROLLABLE REMOVAL OF ONE OR MORE PHASES FROM A LIQUID-LIQUID EXTRACTOR

[75] Inventor: Lorenz Finsterwalder, Karlsruhe, Fed. Rep. of Germany

[73] Assignee: Gesellschaft zur Wiederaufarbeitung von Kernbrennstoffen mbH, Eggenstein-Leopoldshafen, Fed. Rep. of Germany

[21] Appl. No.: 803,317

[22] Filed: Jun. 3, 1977

[30] Foreign Application Priority Data

Jun. 3, 1976 [DE] Fed. Rep. of Germany ....... 2624936

[51] Int. Cl.$^3$ .............................................. B01D 11/04

[52] U.S. Cl. .................................... 210/513; 422/256; 252/301.1 W

[58] Field of Search ............. 210/21, 513, 220, 221 D; 23/267 MS, 270.5 R, 270.5 T; 252/301.1 W

[56] References Cited

U.S. PATENT DOCUMENTS

| | | | |
|---|---|---|---|
| 3,300,405 | 1/1967 | Black | 210/21 |
| 3,526,583 | 9/1970 | Camp | 210/21 X |
| 3,607,101 | 9/1971 | Cochran | 23/267 MS X |
| 3,752,758 | 8/1973 | Hindi et al. | 210/21 |
| 3,994,807 | 11/1976 | Macklem | 210/513 X |
| 3,997,445 | 12/1976 | Hannestad | 23/267 MS X |

*Primary Examiner*—William A. Cuchlinski, Jr.
*Attorney, Agent, or Firm*—Spencer & Kaye

[57] ABSTRACT

An apparatus for controlling the removal of one or more phases from a liquid-liquid extractor having a mixer and a settler for light and heavy phases. The apparatus has a riser tube for the removal of one or more of the heavier phases having one end connected to an opening in the wall of the settler adjacent to a heavier phase and the other end open at a height of a light phase in the settler and a gas intake tube having one end connected to a gas source and its opposite end connected to the riser tube. The control apparatus of the instant invention is particularly suitable for the treatment of organic solvent wastes from radioactive systems.

12 Claims, 1 Drawing Figure

APPARATUS FOR THE CONTROLLABLE REMOVAL OF ONE OR MORE PHASES FROM A LIQUID-LIQUID EXTRACTOR

BACKGROUND OF THE INVENTION

The present invention is directed to an apparatus for the controllable removal of one or more phases from a liquid-liquid extractor, having a mixer and a settler for light and heavy phases, useful in the treatment of organic solvent wastes from radioactive systems.

Various systems are known for controlling the removal of one or more phases present in a settler of a liquid-liquid extractor. These systems are generally susceptible to breakdown during their operation and, therefore, require systematic maintenance. Such systems are particularly not suitable for use in processing of radioactive substances wherein it is imperative that the system used is dependable and substantially maintenance free.

The various float or control valves, due to their susceptibility to malfunction, have not found use in controlling the removal of liquids from settlers in radioactive waste processing plants. The removal of the heavy liquid phase from liquid-liquid extractors in such processing plants is generally controlled by pneumatic syphoning systems. The drawback of these syphoning systems is that they tend to clog even when there is only a small amount of solid contaminants present and, further, they cannot be operated dependably in systems employing more than two phases. The removal of a light phase from a settler by an overflow aided by means of incoming air is well known as discussed by Treybal, in *Liquid Extraction,* page 455, McGraw-Hill (1963) and by S. M. Stoller et al, in *Reactor Handbook,* Volume II, page 581, Interscience (1961). Such a system, though, is restricted to the removal of only the light phase located at the top of the settler and there is no regulation of the light and heavier phase interface position in the settler.

The object of the present invention is to provide an apparatus for automatically regulating the phase interphase position in relation to the properties of the light and heavier phases contained in the settler and provides a control which is substantially maintenance free. The apparatus of the present invention is particularly useful in the treatment of organic wastes from radioactive processing systems and especially suitable in the phosphorus acid adduct treatment of such wastes.

SUMMARY OF THE INVENTION

The above objects and other objects of the present invention are accomplished by a liquid-liquid extractor, including a mixer and a settler, by connecting, via a funnel or tapering member, one end of a riser tube to one wall of the settler at a position adjacent to the phase to be removed and extending the other end of the riser tube to a height of the light phase contained in the settler and connecting a gas intake tube to the riser tube.

Further, the bottom of the settler can be inclined with respect to the horizontal and can form an integral ascending portion with the bottom of the tapering member. The riser tube is fastened at the higher end of the tapering member. Alternately, the tapering member is fastened to the settler in a downward direction at the level of the phase to be extracted or at the bottom of the settler.

Further, the gas influx through the gas intake tube into the riser tube can be regulated by a metering means, such as a flowthrough meter.

The present invention is further affected by having baffle means, such as one or a plurality of spaced and staggered plates, in front of the tapering member and having a collector vessel arranged around the open overflow end of the removal tube with an exhaust air conduit and a discharge conduit being provided at the collecting vessel.

DESCRIPTION OF THE PREFERRED EMBODIMENT

Figure 1:
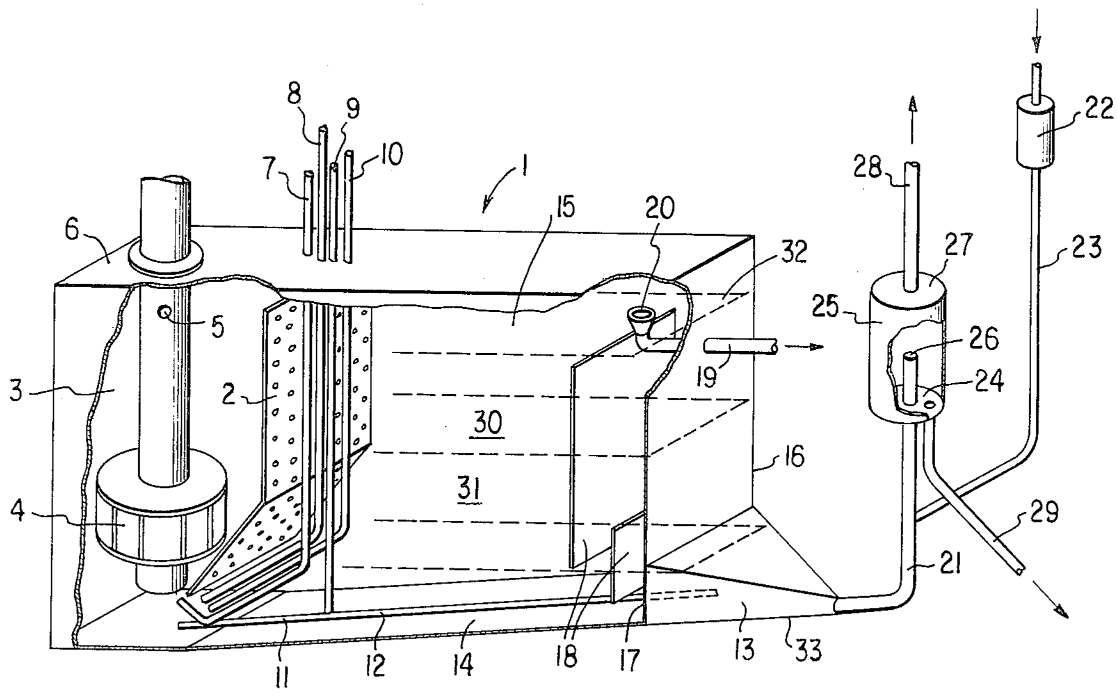
FIG. 1 is a partially broken away perspective view of a liquid-liquid extractor with a control apparatus according to the present invention.

The particular advantages of the apparatus according to the present invention are seen in the fact that a common discharge is provided for one or more of the heavy phases desired to be removed from a liquid-liquid extractor comprising a mixer-settler without there existing the danger of clogging of the apparatus or the depositing of sediment therein. The structure of the present invention is of simple design permitting ready, maintenance free regulation of the separation of the layers present based on the proportional properties of the phase liquids and is, therefore, self-stabilizing. Further, a particular advantage of the apparatus according to the present invention is its ability to permit the common extraction of a plurality of heavy phases as encountered, for example, during the adduct formation in the phosphorous acid adduct process. The low probability of clogging in the discharge conduit as a result of the presence of solid particles and the deposition of separating layers therein are further significant advantages of the apparatus.

The invention will now be explained in detail with respect to one embodiment of the instant invention which is illustrated in the drawing.

The liquid-liquid extractor, including the control apparatus according to the present invention has a mixer-settler 1 which is divided into two chambers, 3 and 15, by a perforated metal sheet 2. In chamber 3 of the mixer-settler, a stirrer, including a stator housing 4 and a return conduit 5 are mounted in cover 6 which is over chamber 3. Conduits 7, 8, 9, and 10 represent conduits for the introduction of various liquids as well as for the purpose of decontamination and discharge as conventionally known. For example, in the phosphorus acid adduct treatment, conduit 7 is used to introduce the tributyl phosphate/dodecane mixture, conduit 8 is used to introduce $H_3PO_4$, conduit 9 is a decontamination connection and conduit 10 is a discharge conduit leading to chamber 3. The decontamination connection 9 is divided into two branch conduits 11 and 12, with conduit 11 extending into chamber 3 and conduit 12 leading to a funnel or tapering member 13.

The liquids entering the mixer chamber 3 are agitated by the stirrer contained therein to form small droplets of at least one of the liquids dispersed in other liquids in the conventional manner. The mixer chamber 3 should be of sufficient size to permit a residence time for the liquids to permit the desired diffusion transfer to occur. The liquids then pass into settler chamber 15 for separation of the lighter and heavier liquid phases present with the lightest phase taking the uppermost position. The bottom member 14 of the settler chamber 15 of mixer-settler 1 is preferably upwardly inclined with respect to the horizontal with its most elevated section being furthest away from chamber 3. The bottom 14 of the settler chamber 15 opens into a bottom portion 33 of funnel member 13 which is fastened to a side wall member 16 of the chamber 15. The bottom portion 33 of funnel member 13 is also upwardly inclined with members 33 and 14 forming an integral inclined member. The funnel member 13 is illustrated as a pyramidal tapering member but, it is realized that it may be of other forms, such as conical. The tapering design of member 13 provides additional phase separation.

Figure 2:
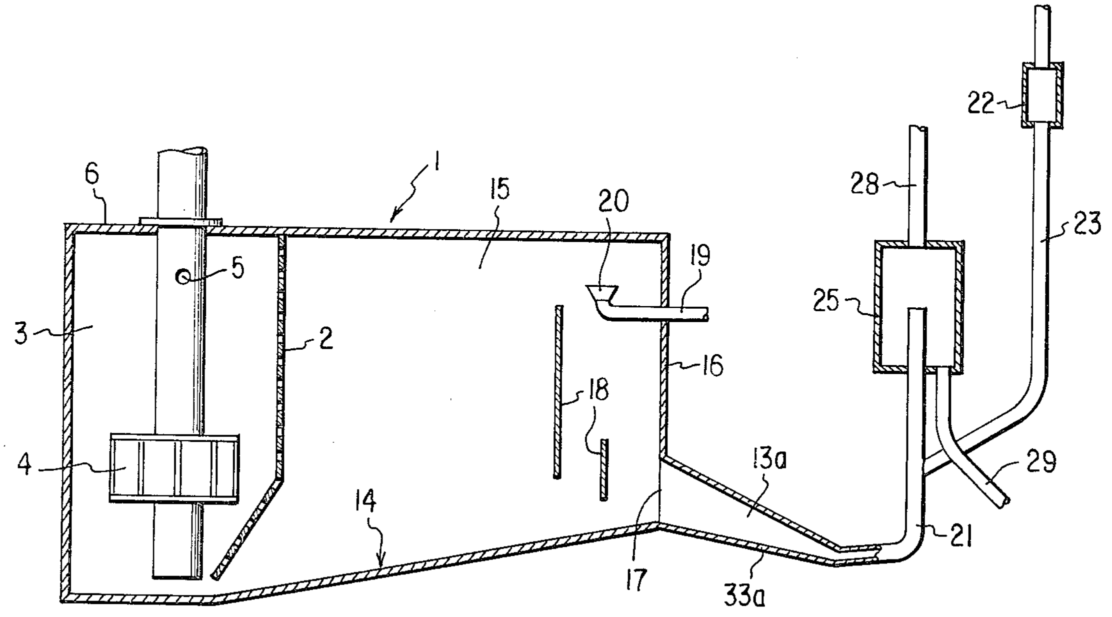
FIG. 2 is a cross-sectional alternate design showing bottom member of the tapering member in a downwardly orientation with respect to the bottom of the settler.

Further, the funnel member 13 may be located at any other desired point depending on the location in chamber 15 of the one or the other liquid phase or phases which are to be extracted. For example, it is possible, in a two-phase system, to connect the funnel member to an opening in bottom member 14 and to orient it downwardly. This is shown in FIG. 2 by funnel member 13*a*–33*a*.

Funnel member 13 opens at its smaller end into a vertical riser tube 21 which extends to a height equal to the level of the light phase contained in chamber 15 and, normally, to overflow opening 20.

Gas, in the form of air, is introduced into riser tube 21 by a gas inlet conduit 23 which is connected to tube 21 at an intermediate point thereon. The gas is supplied from a gas source (not shown) and its flow rate is regulated by a metering apparatus 22 in the form of a flow-through meter. The introduction of air into riser tube 21 produces movement of the liquid which is dependent on the quantity and rate of air introduced and the hydraulic pressure formed by the pressure of the individual phases in mixer-settler 1. The proportion of liquid level in riser tube 21 above the gas inlet 23 without the introduction of air in relation to the conveying level above the air inlet is normally about 80 to 90% and consists of the manometric pressure of the total liquid in mixer-settler 1.

Plates 18 are disposed in a spaced and staggered manner in front of funnel member opening 17 to hold back the mixed phase. These plates have a calming effect and further provide separation of the lighter phase which may be present in funnel member 13 itself. The lightest phase, i.e. the uppermost phase in chamber 15 is able to flow off through an outlet 19 which is provided with a funnel opening 20. The open end 26 of riser tube 21 terminates at an intermediate point within collecting vessel 25. An air exhaust line 28 is fastened to cover plate 27 of collecting vessel 25 and a discharge conduit 29 for the adduct and the approximately 12M $H_3PO_4$ leads from the base plate 24 to the separator (not shown).

The self-regulation of the phase interface in relationship to the proportional characteristic of the light and the heavy phase (e.g. phases 30 and 31) is based on the following principle:

If, for example, as a result of feeding in the heavy phase (concentrated phosphorus acid) the phase interface rises, the product of density times height increases and, thus, the hydrostatic pressure in tube 21 increases. With a constant amount of air bubbled in through gas feed tube 23, the heavy phase is conveyed to overflow vessel 25 until the position of the phase interface remains constant.

If the phase interface drops and the amount of air bubbled in remains the same, less of the heavy phase is extracted and the phase interface is stabilized at a lower level. The bubbling in of air also reduces the danger of clogging in that it prevents the caking together of mud or deposits in discharge conduit 29. Likewise, the device in the illustrated pot mixer-settler operates with three liquid phases of different densities and is capable of extracting the two heavy phases together. The second phase interface which then forms adjusts itself to the intake level of removal tube 21.

The illustrated apparatus which has length, width, and height dimensions of 900 mm×300 mm×600 mm is used with advantage in the phosphorus adduct process for the continuous adduct formation with concentrated phosphorus acid. The dodecane phase is then separated in settler 15 while phosphorus acid and adduct, in part, form viscous emulsions.

Tube 21 leaves the apparatus about 400 mm below the dodecane liquid surface 32 and has a connection for the air intake line 23 at a height of about 120 mm. The adduct (density 1.1 to 1.2 g/cm$^3$) and phosphorus acid (density 1.5 g/cm$^3$) can be easily extracted together with the bubbling in of air at a rate of 50 to 70 liters per hour. The position of the phase interface depends on the rate of air used and remaining constant once an equilibrium has been reached.

It will be understood that the above description of the present invention is susceptible to various modifications, changes and adaptations, and the same are intended to be comprehended within the meaning and range of equivalents of the appended claims.

What is claimed is:

1. In a liquid-liquid extractor, including a settler for separation of light and heavy liquid phases, an arrangement for controllable removal of one or more liquid phases said arrangement comprising: a tapering member connected to an opening in a wall of the settler for removing a heavy phase from the settler; a first tube having a first end connected to an opening in said tapering member and a second end extending to the level of a light phase; and a second tube and means for introducing a gas into said second tube, said second tube being connected to said first tube for introducing gas into said first tube to move liquid present in the first tube in an upwardly direction.

2. The apparatus of claim 1, wherein said tapering member has its large end connected to the settler and its small end connected to said first tube and said second tube has one end connected to said first tube at an intermediate position thereof.

3. The apparatus of claim 2, wherein the tapering member is connected to said settler at a point remote from the mixer and adjacent the phase to be removed.

4. The apparatus of claim 3, wherein a bottom member of said tapering member is upwardly inclined with respect to the horizontal, the higher end of said inclined bottom member is connected to the first end of said first tube and said bottom member forms an integral inclined portion with a bottom member of the settler.

5. The apparatus of claim 3, wherein said tapering member is connected in a downwardly orientation with respect to the bottom member of the settler.

6. The apparatus of claim 3, further comprising a metering means connected to said second tube for regulating the flow of gas therethrough.

7. The apparatus of claim 2, further comprising metering means connected to said second tube for regulating the flow of gas therethrough.

8. The apparatus of claim 7, further comprising a metering means connected to said second tube for regulating the flow of gas therethrough.

9. The apparatus of claim 2, further comprising at least one staggered plate disposed in front of the large opening of the tapering member.

10. The apparatus of claim 2, further comprising an overflow vessel having a bottom member and a top member, said second end of said first tube terminating at an intermediate point in the overflow vessel, means for removing the gas connected to said top member, and means connected to the bottom member for removing the heavy phase from said overflow vessel.

11. In a liquid-liquid extractor including a settler for separation of light and heavy liquid phases suitable for treatment of organic solvent wastes from radioactive systems, the improvement comprising the control arrangement of claim 1.

12. In a liquid-liquid extractor including a settler for separation of light and heavy liquid phases, the improvement being an arrangement for controllable removal of one or more liquid phases, comprising: a first tube having a first end connected to an opening in the settler for removing a heavy phase from the settler and a second end extending to the level of a light phase; and a second tube and means for introducing gas into said second tube, said second tube having one end connected to said first tube for introducing gas into said first tube to move liquid present in the first tube in an upwardly direction.

* * * * *